United States Patent [19]

Varga et al.

[11] Patent Number: 4,621,527

[45] Date of Patent: Nov. 11, 1986

[54] FLAT GLASS SIGHT GAUGE

[75] Inventors: Otto H. Varga, Bradford-on-Avon; Montague A. Robbins, Backwell, both of England

[73] Assignee: Seetru Limited, Bristol, England

[21] Appl. No.: 756,988

[22] PCT Filed: Dec. 20, 1984

[86] PCT No.: PCT/GB84/00442

§ 371 Date: Jul. 11, 1985

§ 102(e) Date: Jul. 11, 1985

[87] PCT Pub. No.: WO85/02904

PCT Pub. Date: Jul. 4, 1985

[30] Foreign Application Priority Data

Dec. 23, 1983 [GB] United Kingdom ............... 8334305

[51] Int. Cl.$^4$ .............................................. G01F 23/02
[52] U.S. Cl. ....................................... 73/329; 116/227
[58] Field of Search ......................... 73/329, 327, 323; 116/227, 276; 137/558

[56] References Cited

U.S. PATENT DOCUMENTS

| 231,350 | 8/1880 | Nunns | 73/329 |
| 1,082,441 | 12/1913 | Paul | 73/329 |
| 1,181,139 | 5/1916 | Huntress | 73/329 |
| 1,183,872 | 5/1916 | Groff | 73/327 |
| 1,954,466 | 4/1934 | Aicher | 73/329 |
| 2,326,448 | 8/1943 | Ernst | 73/329 |
| 2,326,449 | 8/1943 | Ernst | 73/329 |
| 2,608,095 | 8/1952 | Miller | 73/329 |
| 2,767,586 | 10/1956 | Jancosek | |
| 3,358,510 | 12/1967 | Hoffmann | |

FOREIGN PATENT DOCUMENTS

| 546786 | 10/1959 | Belgium | 73/323 |
| 688581 | 3/1953 | United Kingdom | |

Primary Examiner—Charles Frankfort
Assistant Examiner—Denis E. Corr
Attorney, Agent, or Firm—Dennison, Meserole, Pollack & Scheiner

[57] ABSTRACT

The invention provides a flat glass sight gauge which may have a length ranging up to 4 meters or more and in which a plurality of sight glasses (10) are aligned end to end to give the required length, the glasses being bolted to a frontal face of a structurally stiff metal backing plate (13), the fluid connections required between the aligned glasses (10) being formed at the rear of the backing plate (13), by rigid metal connector blocks (16) which serve also to give structural reinforcement to the backing plate (13) at the ends of the sight glasses (10). This proposal allows for efficient sealing of all the liquid passages of the gauge and for structural integrity of the gauge assembly, enabling it to withstand rough handling, vibration and severe changes of pressure and temperature.

16 Claims, 16 Drawing Figures

FLAT GLASS SIGHT GAUGE

This invention relates to liquid level gauges incorporating aligned flat sight glasses.

Flat glass sight gauges are known, in which a heavy pressed safety glass with a grooved or fluted face on the liquid side is clamped with intervening seals or gaskets between a metal windowed plate and a metal base plate. The base plate may define in part, a passage in which the liquid, whose level is to be viewed, rises and falls. The grooved or fluted face of the glass which is in contact with the liquid provides an optical effect, whereby the appearance of the glass is silvery in the space above the liquid, but black where liquid is present. This contrast is very helpful in rendering visible the level of even colourless liquids.

In the past flat glass gauges have been either of such a weak structural design that they have been prone to breakage or leakage, or, they have been excessively heavy and cumbersome in construction, and it is one purpose of the present invention to provide a gauge construction with good strength/weight characteristics and which still offers the full safety which is normally expected from these gauges, against breakage and leakage under pressure, vibration, rough handling and severe changes of temperature.

It is a purpose of this invention to provide a gauge, which is of bolted up kit construction, which is easy to install without need for any vulnerable weld or braze joints which are often difficult and costly to produce and in particular, whose length may vary. The length of the gauge can range up to 4 meters or more, and the scope of application of the gauge construction, as now envisaged, is for measuring, by sight, the levels in containers, of fuels, oils and non viscous liquids up to, say, 1500 secs. Redwood, whether stored in atmospheric tanks and reservoirs or in tanks under pressure of up to say, 5 bar.

Broadly, the invention provides a flat glass sight gauge in which a plurality of sight glasses are aligned end to end to give the required length, the glasses being bolted to a frontal face of a structurally stiff metal backing plate, the fluid connections required between the aligned glasses being formed at the rear of the backing plate, by rigid metal connector blocks which serve also to give structural reinforcement to the backing plate at the ends of the sight glasses.

As will be seen this proposal allows for efficient sealing of all the liquid passages of the gauge and for structural integrity of the gauge assembly, enabling it to withstand rough handling, vibration and severe changes of pressure and temperature.

A particular advantage which is achieved by the construction now proposed, is that efficient sealing may be accomplished by interposing sealing strips or gaskets between surfaces which are planar and continuous over the whole area of each seal. This sealing efficiency is obtainable firstly, in the case of the seal between the flat sight glasses and the backing plate, which seals can completely surround the mouth of a liquid receiving trough in each glass,; and secondly, in the case of sealing gaskets interposed between the backing plate on its reverse side, and the connector blocks. These flat surfaces can be made to bring pressure evenly on to the whole area of each seal, suitably by employing the same bolts which are used to secure the glasses and the connector blocks to the backing plate.

The invention affords a versatile sight gauge installation which may have a length ranging up to 4 meters or more. It utilizes a plurality of flat sight glasses aligned end to end. The structural integrity of the installation is provided mainly by the backing plate. Where two or more backing plates are provided the rigid metal connector blocks bolted to the rear of the backing plate, form a structural bridge between the aligned backing plates. At the same time, the connector blocks provide liquid inter-communication, with efficient sealing, between adjacent aligned glasses. A cover plate bolted to the backing plate contributes to the structural strength of the installation, the glasses themselves being largely relieved of stress. This structural strength enables the installation to withstand vibration, rough handling and changes of pressure and temperature. The versatility may be enhanced by C-clamps for securing the installation to a tank wall, being adjustable longitudinally of the backing plate; while provision for positional adjustment of its end fittings is also provided for, as is the equipping of the gauge with the ability to have end fittings of any required type attached to rigid end connector blocks or pipes leading therefrom.

Sight gauge constructions are known whereby the sight tubes terminate in banjo-type couplings or unions which are fitted over cylindrical pipes having bores communicating with the interiors of liquid containers; or the banjo-type couplings may be fitted over cylindrical parts of valve bodies, screwed into tank walls or into bosses formed on such walls of containers or tanks. There are many installations of gauges in existence with banjo-type couplings of the kind referred to, but fitted with round glass tubes. It is one purpose of the present invention to allow conversion of gauge installations, from round to flat glass sight tubes, with an execution which will meet up to date Official requirements for flat glass gauges. Acordingly, it is a further intention that the gauge proposed, should be capable of being equipped with one or more end fittings of the kind comprising banjo-type couplings, such as will fit over existing cylindrical tank fittings, which may be valve bodies screwed into suitable tank bosses.

The present invention provides according to one aspect, a flat glass sight gauge comprising at least two sighting glasses aligned end to end and each comprising an elongate glass block having a longitudinal trough formed in a major face thereof so as to be surrounded by a continuous substantially planar marginal portion of that face, which trough has a base provided with longitudinal prismatic grooves; an endless strip of sealing material being disposed to extend around said trough and to form a seal between a said substantially planar marginal face portion of a said sighting glass and a metal backing plate. Both means are provided for clamping each said sighting glass to a said backing plate. The or each said backing plate is apertured at or towards each end of each said trough and a rigid metal connector block is bolted to the reverse side of the backing plate and sealed over the rear of each said aperture, said connector block having a duct giving sealed intercommunication between adjacent ends of successive troughs intermediate the ends of the gauge, and, at the ends of the gauge, between the ends of the troughs and a respective gauge end fitting, said connector blocks serving also to provide structural reinforcement to the gauge in regions where the glass blocks terminate.

Said backing plate is preferably U or channel-shaped in cross-section, so as to to structurally stiff, and it may be longitudinally co-extensive with at least two such glass blocks secured to its frontal face in end to end alignment; or, a plurality of backing plates may be arranged in end to end alignment, each backing plate having a single glass block secured on its frontal face.

Preferably, the means providing intercommunication between the adjacent ends of the troughs of two adjacent glass blocks, comprise metal connector blocks secured on the reverse faces of the backing plate or plates, the connector blocks being formed with cavities and/or holes and passages which will provide liquid interconnections between adjacent aligned glass blocks, while liquid tight seals are formed with the aid of sealing rings or gaskets bedding against said backing plate on its reverse side, and against the connector blocks.

The metal connector blocks secured on the reverse sides of the backing plate or plates, may have holes aligning with holes in the backing plate, there being sealing rings surrounding the mouths of the holes in the connector blocks and passage means in each connector block leading between the holes in the block. Such a connecting block will be provided at each junction between adjacent aligned glass blocks.

Each glass block is preferably secured against the backing plate by being sandwiched between the backing plate and a cover plate, the cover plate being bolted to the backing plate and having lateral flanges which butt with the backing plate on tightening the bolts so as to limit excessive transverse flexing of the backing plate.

Each said cover plate may be longitudinally co-extensive with at least two glass blocks arranged end to end in alignment.

At least two sighting glasses are described above, together with means for providing liquid flow intercommunication between the troughs of adjacent glasses are preferably combined in an installation. Such an installation will include adjustable clamping means for securing it to the wall of a liquid container and means will be provided, preferably in the form of a positionally adjustable end fitting to give liquid flow intercommunication between the tank interior and the trough in which the liquid rises and falls so that its level can be viewed through of the flat sight glasses.

According to this aspect of the invention, such an installation comprises, in combination; at least two elongate rectangular blocks of glass, each block having formed in one of its major faces a trough which extends longitudinally of the major length of said face, but terminates short of the ends of the block, so as to leave a flat surface on the said major face of the block surrounding the mouth of the trough of each glass block; the base of each trough being formed with a plurality of longitudinally extending, parallel prismatic grooves; a metal backing channel which is longitudinally extensive with at least one of said glass blocks; an endless strip of sealing material being disposed on said flat surface surrounding the mouth of the trough; said strip being sandwiched between the block and a flat frontal face of the backing channel to which the block is clamped; the said backing channel being apertured to provide holes leading to the opposite ends of the trough; and wherein the at least two such glass blocks are secured end to end in alignment and including means for providing liquid intercommunication between the holes leading to adjacent ends of the two troughs of the said two adjacent blocks; said means comprising for each junction between adjacent glass blocks, a metal connector block secured on the reverse face of the backing channel between lateral flanges of said channel which extend longitudinally over the full length thereof; the connector block having a duct communicating between the holes in the backing channel, each said hole communicating with an end of a said trough, and sealing means surrounding the mouths of the holes in the connector block; the means securing the connector block to the reverse face of the backing channel consisting of bolts, which on being tightened, also impose pressure on the seals.

Preferably, in such an intallation, the gauge is provided at one or both of its ends with a banjo-type pipe coupling for providing liquid flow intercommunication between the adjacent end of a sight glass trough, and the bore of a pipe communicating with the interior of a liquid container, said trough and said pipe bore extending approximately at right angles to one another and said banjo-type coupling surrounding said bore, the distance between the banjo-type pipe coupling and the trough being adjustable in the direction in which the trough extends longitudinally.

At least one clamp may engage each backing channel with means for affixing the clamp to a wall for mounting the gauge onto a liquid container of which said wall forms a part. Said clamp may be a C-clamp and will be adjustable longitudinally of the backing channel, prior to being or after having been fixed to the tank wall.

The connector blocks, in some cases, may form structural connections between adjacent backing plates which are aligned end to end.

The invention will be described, by way of example, with reference to the accompanying drawings in which:

FIG. 4 also shows a connector block device of a first preferred type, for providing liquid flow intercommunication between liquid passages, or as they will be termed, troughs, of two sight glasses disposed end to end in alignment.

FIGS. 11 to 14 are views of a component of the connector block used in FIGS. 7 and 10; FIG. 11 being a plan view; FIGS. 12 and 13 being cross-sectional views, taken respectively, on the lines XII—XII and XIII—XIII shown in FIG. 11; while FIG. 14 is an under plan view.

Referring now to the drawings, and first in particular to FIGS. 1 to 4, a flat glass sight gauge comprises at least two sighting glasses 1a and 1b, which are aligned end to end. Each sighting glass comprises an elongate glass block 10, having a longitudinal trough 15 (whose base is provided with longitudinal prismatic grooves 11) formed in a major face of the block so as to be surrounded by a continuous substantially planar marginal portion 14 of that face of the block.

Figures 2, 3:
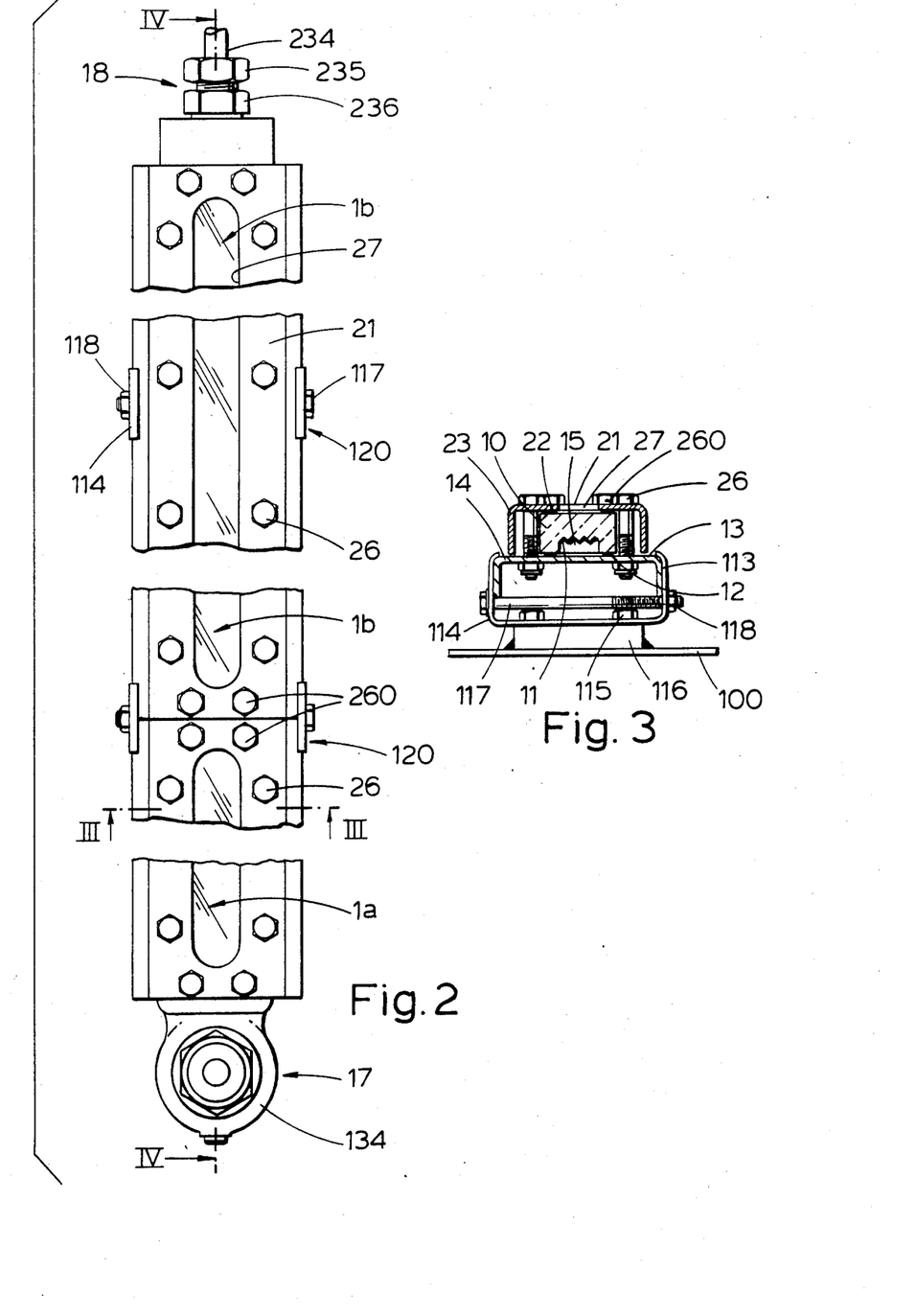
FIG. 2 is a front view of the assembly shown in FIG. 1.
FIG. 3 is a cross-sectional view taken on the lines indicated at III—III of FIG. 2.

At least one endless strip 12 of sealing material, is disposed to surround each trough 15 and to form a seal between the substantially planar face portion 14 of each glass block 10 and a a frontal planar face of a metal backing plate 13. The backing plate 13 has lateral flanges 113 so that it is U-shaped as seen in FIG. 3; this U or channel-shape gives the backing plate a configuration of great structural stiffness.

Clamping means, for clamping each said sighting glass to a said backing plate 13, comprise a cover plate 21 secured to the backing plate 13, on bolts 26 being tightened. Strips 22 of cushioning material are interposed between the glass 10 and the cover plate 21. The cover plate 21 has lateral flanges 23 which may abut with the backing plate 13; the flanges also prevent flexing of the plate 13 when the bolts 26 are tightened.

Thus, the gauge assembly, when bolted up will be afforded structural stiffnes and strength, by the channel configuration given to both the backing plate 13 and to the cover plate 21.

Figure 1:
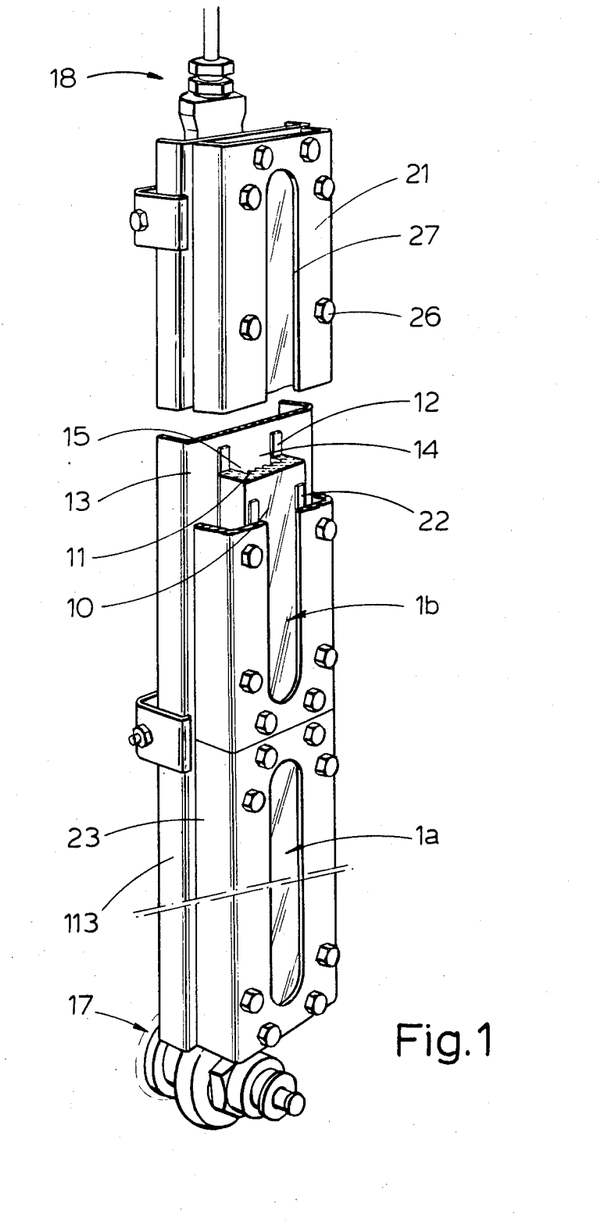
FIG. 1 is a perspective view, cut-away in part, of a flat glass sight gauge assembly.

Each cover plate 21 may be co-extensive with two glass blocks 10, disposed aligned end to end, and in the example shown in FIG. 1, the backing plate 13 is also co-extensive with the two blocks 10 forming the sight glasses 1a and 1b. The cover plate 21 has oblong windows 27 through which the glasses are exposed to view.

Each said backing plate 13 is apertured at or towards each end of the trough 15 in each block 10, and conduit means in the form of connector blocks generally designated 16, (see FIG. 4), are sealed over the rear of each said aperture so as to give sealed intercommunication between adjacent ends of successive troughs 15, intermediate the ends of the gauge. At the ends of the gauge, further connector blocks 16 are provided to give sealed liquid flow intercommunication between the ends of the troughs 15 and two gauge end fittings, generally designated 17 and 18.

The troughs 15 interconnected by the conduit means 16, form a closed passage way, extending continuously between the end fittings 17 and 18. Liquid admitted through the end fitting 17, which will be disposed below the fitting 18 when the gauge is disposed for use, will enter the continuous passage way, and its level in the passage way can be detected through the viewing windows 27 and through the glass blocks 10.

As will be seen, it is possible to arrange any required number of glass blocks 10 disposed end to end, and it is a feature of the design that the distance between the end fittings 17 and 18, is adjustable, within limits wide enough to allow convenient installation on existing, or on new, bosses or tappings formed on or in the walls of a container, and which bosses or tappings may be positioned with their centres at relatively wide tolerances.

This is achieved, for example, by the longitudinal adjustability of the clamping means to be described with reference to FIG. 3, and by the arrangement for longitudinal adjustability of the upper end fitting shown in FIG. 16, and which will be described below. First however, the lower end fitting will be described with particular reference to FIG. 4.

Figures 4, 15, 16:
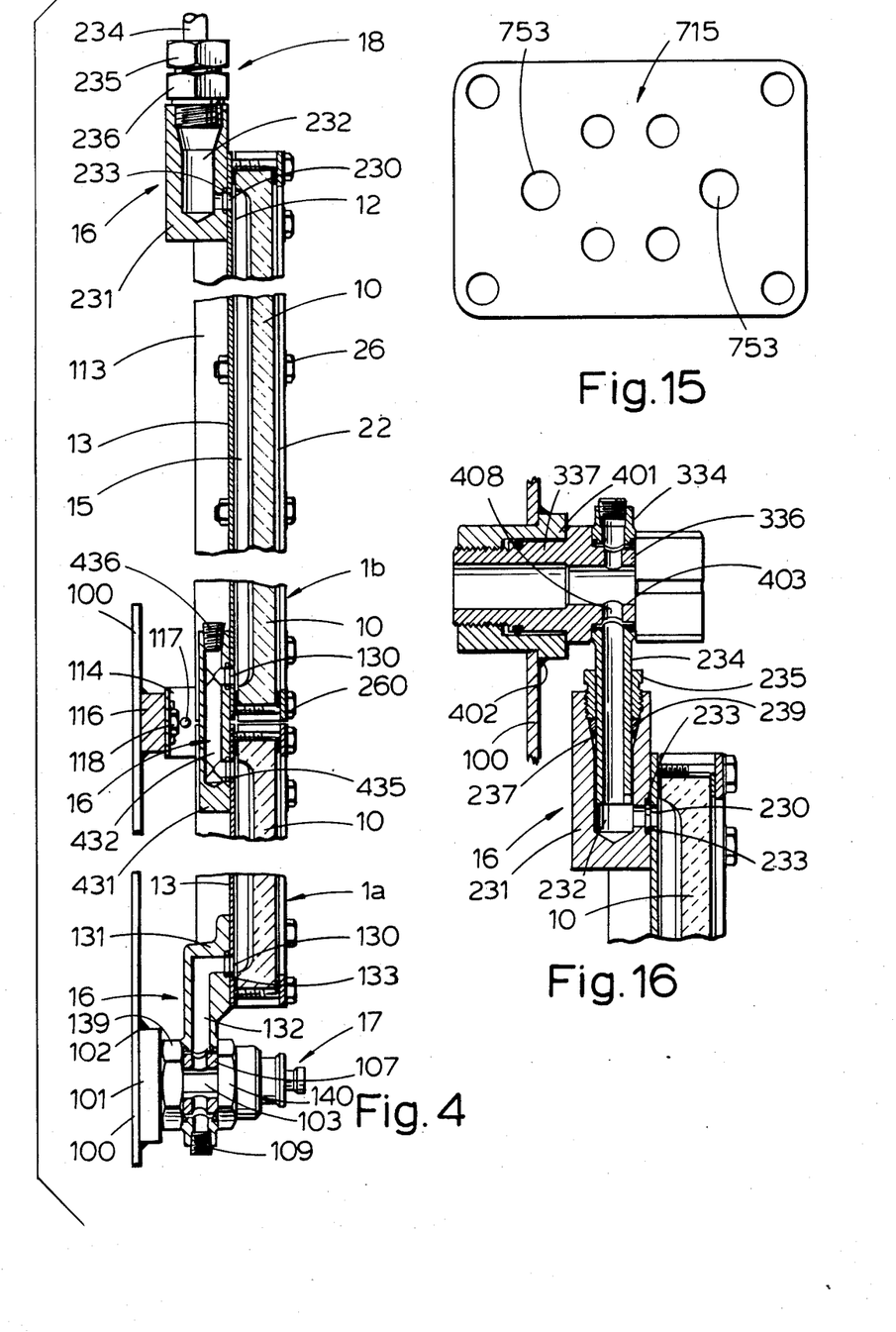
FIG. 4 is a cross-sectional view taken on the line IV—IV of FIG. 2.
FIG. 15 is a plan view of a sandwich plate employed between the sealing gaskets of the arrangment depicted in FIG. 10.
FIG. 16 is a view similar to the upper portion of FIG. 4, showing in cross-section, an alternative upper end fitting for the gauge assembly.

In FIG. 4, 100 represents the wall of a tank or container. A boss 101 is welded at 102 to the tank wall 100, and the boss has a through bore 103, which will communicate through a hole in wall 100 (not shown) with the interior of the tank. 10 indicates a glass block of a sight gauge and the block 10 defines a trough 15 extending over a frontal face of the backing plate 13. Adjacent the end of the trough 15 the backing plate is apertured at 130. Bolted to the rear of the backing plate 13 is a connector block 131 which contains a passage 132 which communicates with the hole 130 and with the trough 15. 133 is a seal at the mouth of the hole 130. The block 131 has a banjo-type extension 134 (see also FIGS. 1 and 2) which fits over a cylindrical extension 107 of the boss 101. This cylindrical extension 107 defines the bore 103 and has also radial bores 108 which provide communication between the bore 103 and the passage 132 in the connector block 131. The extension 107 of the boss (which may be an existing valve or like fitting provided on the wall of a tank or container) is threaded to receive nuts 139 and 140 for clamping the banjo-type extension 134 of the connector block 131. 109 generally represents a tap screw which may be employed to drain the contents of the sight guage.

The upper end fitting 18 in FIG. 4, comprises a connector block 231 bolted to the rear face of backing plate 13, and having a passage 232 communicating with the trough 15 through a hole 230 in the backing plate 13. A pipe 234 is secured by a gland nut 235 to a fitting 236 threadedly secured to the block 231. 233 is a seal at the mouth of the hole 230 in the backing plate 13, the seal being seated in a recess formed for the purpose in the connector block 231.

The upper end fitting in FIG. 16 is somewhat similar to that shown in FIG. 4, except that the pipe 234 is adjustable longitudinally relative to the connector block 231, such adjustability being permitted by a gland nut 235 which in this case is threaded to a tapped hole in the block 231 to urge a seal ring 237 backed up by a washer 239 to seal between the pipe and the block 231 which has a frusto-conically tapering bore in this region. The pipe 234 leads to a banjo extension 334 which surrounds a spigot 336. The spigot 336 is cylindrical and forms part of a hollow plug 337 which is threaded in a boss 401 secured by welds 402 to a tank wall 100. The spigot 336 has an axial bore 403 and radial bores 408, which communicate with the bore of the pipe 234.

The adjustability of the pipe 234 relative to the block 231, will provide accommodation for variations, within predetermined limits, of the pre-established distances between the locations on the tank wall 100, for the bottom fitting 17 and for the upper fitting 18 of FIG. 16. Further variation in the distance between such upper and lower locations, already established in the case of existing tanks, will be accommodated by including in the gauge installation, an appropriate number of sighting glasses 1a, 1b, each of an appropriate length and arranged end to end; these will be provided with intercommunicating means for their respective troughs as will be described below, first with reference to FIGS. 4 to 6, alternative intercommunicating means being shown in FIGS. 7 to 15.

Referring to FIGS. 1 to 4, the end fittings 17 and 18 may be seen and understood to provide means for securing the ends of the guage assembly to the tank wall 100. At intermediate regions of its length the guage will be secured by the clamping arrangement depicted in FIG. 3. In FIG. 3, 10 again represents the sight glass, and 21 its windowed cover plate, secured by bolts 26 to the backing plate 13, 12 and 22 being interposed sealing strips. 23 again designates the lateral flanges of the cover plate 21 which butt with the backing plate 13 to limit flexing of the latter. The backing plate 13 itself has lateral flanges 113 which afford it structural stiffness. 114 represents a C-clip secured by bolts 115 to a boss 116, welded to the wall 100 of the tank. The C-clip 114 embraces the flanges 113 of the backing plate 13, and is tightened by means of a clamping screw 117 having a nut 118.

In FIG. 2, such a clamping arrangement is designated generally at 120 and any number of clamps 120 may be provided, as necessary, over the length of the guage, such as will locate it securely on the tank wall. Such clamps will be adjustable longitudinally of the backing plate so that they may be located appropriately to be bolted to pre positioned bosses 116 welded to the wall 100. Alternatively in another installation the clamps might be affixed to threaded sockets by fixing bolts, such sockets already existing in the wall 100, and the clamps may need to be appropriately adjusted to suit the locations of these sockets. In the case of a new installation an appropriate number of evenly spaced bosses 116 may be welded in position; or threaded sockets may be provided for receiving bolts 115.

Figures 5, 6:
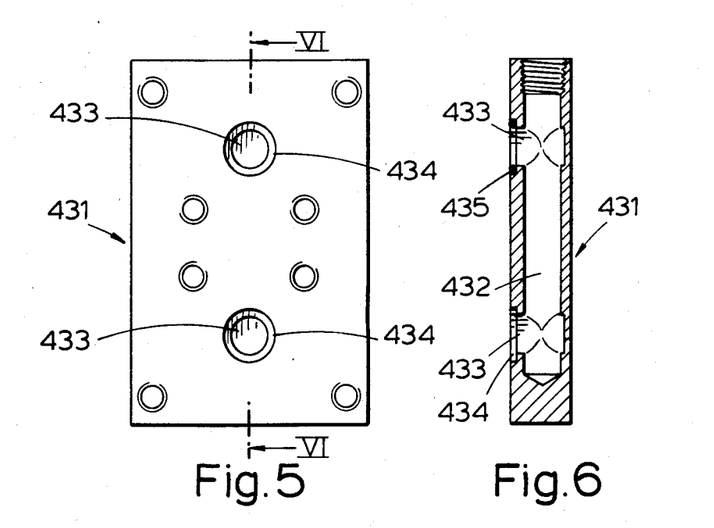
FIG. 5 is a plan view of a connector block of the type used in FIG. 4.
FIG. 6 is a cross-sectional view taken on the line VI—VI of FIG. 5.

Reference will now be made to FIGS. 4, 5 and 6. In FIG. 4, two sight glasses 1a and 1b are shown aligned with their ends nearly abutting. Each comprises a glass block 10 defining, with a backing plate 13, a trough 15. At the junction between the two glasses 10, means have to be provided for interconnecting the adjacent ends of the two troughs 15. In the embodiment of FIGS. 4 to 6, these interconnecting means comprise the connector block 431, shown in FIGS. 5 and 6, secured by bolts 260 to the reverse face of the backing plate 13 between its lateral flanges 113.

The backing plate 13 has through holes 130 opening into the troughs 15. The connector block 431 has one longitudinal bore 432 and two transverse bores 433, the latter being positioned to align with the holes 130, and having enlarged mouth cavities 434 to receive O-rings 435 for sealing with the backing plate 13 about the mouths of its holes 130. The longitudinal bore is closed at one end by a plug 436 its other end being blind. The block 431 has tapped holes to receive the ends of bolts 26 and 260, whereby it is secured on the reverse side of the backing plate 13.

Instead of the O-rings 435, there could be employed a gasket as will be described below with reference to FIGS. 7 to 15, such a gasket being shown in FIGS. 8 and 9, in which case the cavities 434 might also be omitted.

A different design of connector block 731 is shown in FIGS. 11 to 14. This is employed in the arrangements of intercommunicating means shown in FIGS. 7 and 10.

Figure 7:
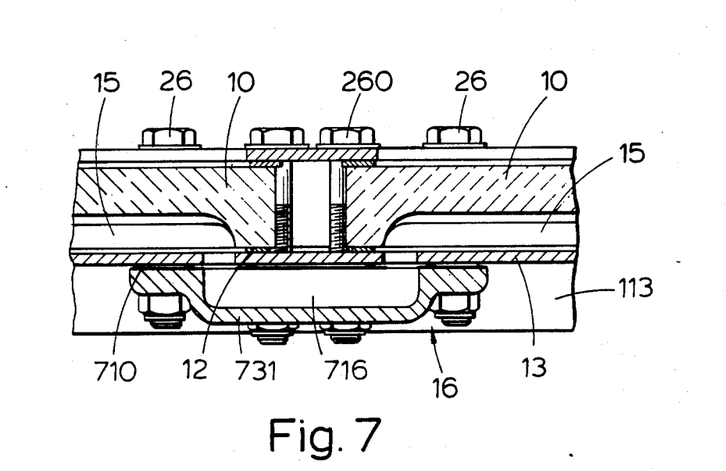
FIG. 7 is a cross-sectional view of a second preferred type of connector block.
Figure 10:
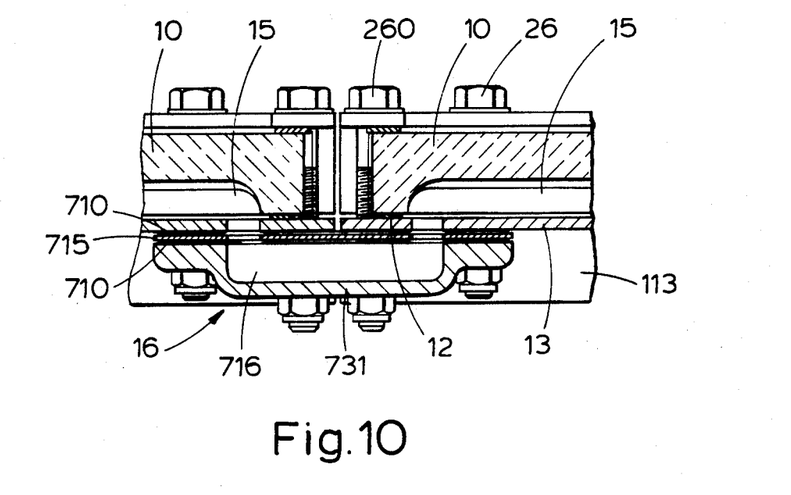
FIG. 10 shows a connector block of the same type depicted in FIG. 7, but shown when employed in a butt joint between two sight glasses and two backing plates each disposed end to end.

In FIGS. 7 and 10 two glass blocks 10 are aligned end to end, each having a trough 15. In the case of FIG. 10 each glass block 10 has its own backing plate, while FIG. 7 illustrates a junction in the case of a backing plate and a cover plate which are co-extensive with two glass blocks 10.

Figure 8:
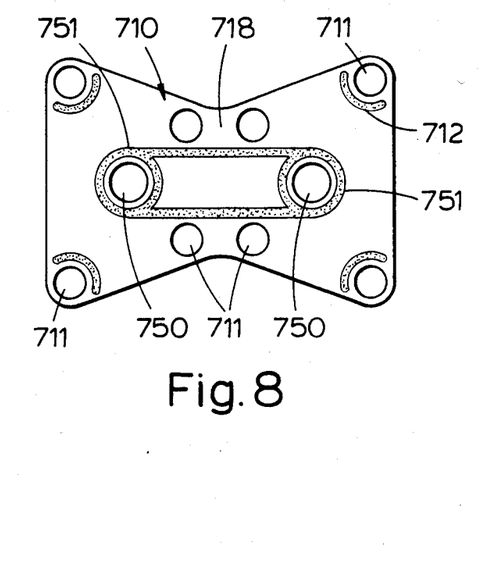
FIGS. 8 and 9 are plan and side views of a gasket used in sealing the connector blocks of the type shown in FIGS. 7. and 10.
Figure 9:
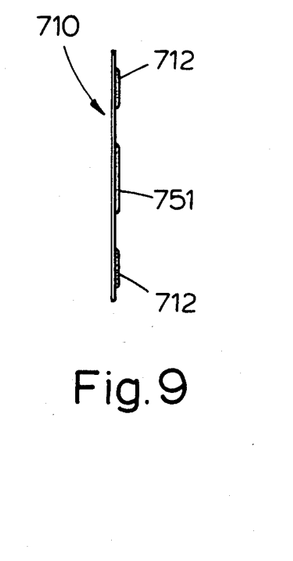

In the arrangement shown in FIG. 7, a single gasket 710 of the type shown in FIGS. 8 and 9 is sandwiched between the connector block 731 and the backing plate 13.

In FIG. 10 however there is a butt joint between two backing plates 13. Accordingly it is necessary to employ one gasket 710 against the backing plates 13 and a second gasket against the connector block 731. A plate 715, (shown in FIG. 15) is sandwiched between the two gaskets 710. The gaskets 710, the sandwich plate 715, and the connector block 731 are all apertured to allow passage to the stems of bolts 26 and 260.

Nuts are shown threaded on these bolts in these arrangements as illustrated; however the bolts could engage tapped holes in the connector block 731.

The gasket 710 shown in FIGS. 8 and 9, has a main body position 718 of planar configuration preformed with holes 711 to allow passage to the bolts as described. It also has two through holes at 750 which are calculated to align with holes 130 of the plate or plates 13 leading to the adjacent ends of aligned troughs 15 in the glass blocks 10. Around the holes 750, the gasket has preformed upstanding annular beads 751; also upstanding are bead portions 752 which, with the beads 751, have an oval configuration in plan view.

Figures 11, 13:
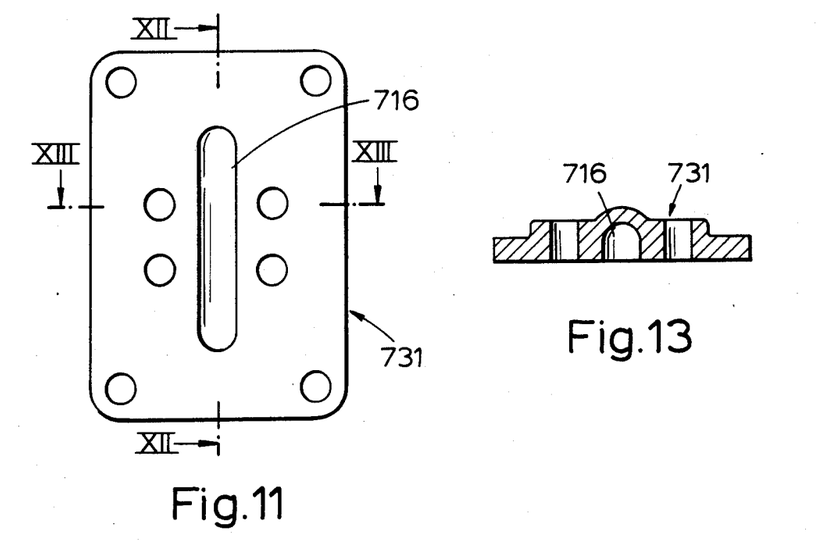
Figure 12:
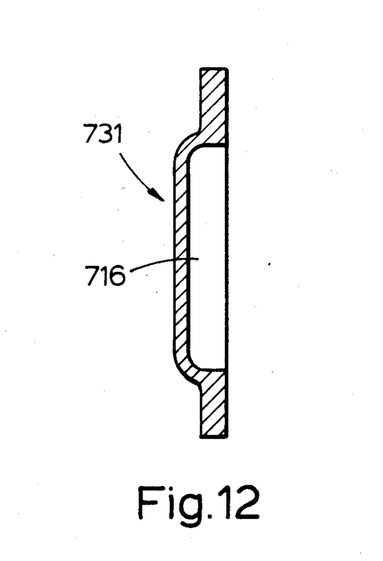
Figure 14:
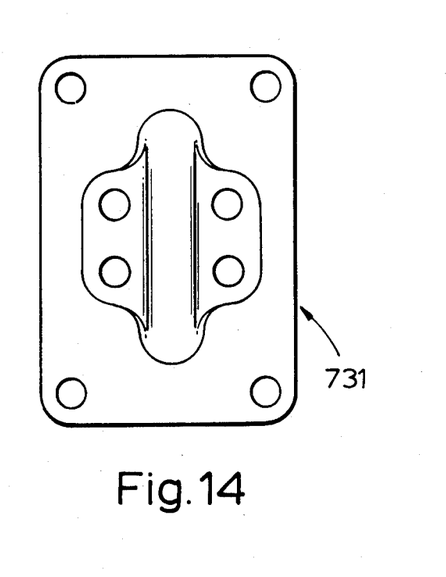

In the case of the sandwich gasket construction of FIG. 10, the annular beads of the upper gasket, seal about the mouths of the holes 130 in the backing plates 13, while the oval bead of the lower gasket, seals about the mouth of an oval trough 716 of the connector block as best shown in FIG. 11. Finally, the gasket 710 may have short bead portions 712 adjacent its bolt holes 711.

The sandwich plate 715, of FIG. 15, has holes for the bolts and two holes 753 to align with the holes 750 of the gaskets 710.

The sandwich plate 715 is suitably of stainless steel, as are preferably, each connector block, each cover plate 21 and each backing plate 13.

It will be noted in FIG. 10 that not only is each backing plate 13 co-extensive with each glass block 10, but so also is each windowed cover plate 21. Thus in this embodiment the bolts 26 secure each block 10 to form a unit with its own backing plate 13 and cover plate 21; the bolts 260 being to secure the extreme ends of the abutting units and to provide an even distribution of pressure upon the whole extent of the seals 12 surrounding each trough and upon the gasket 710 whose bead 751 surrounds the trough 716 in the connector block 731. It will also be noted that the connector block 731, secured by the bolts 26 and 260 forms the sole structural connection between the two flat glass units aligned end to end, as shown in FIG. 10.

The invention provides significant improvements in flat glass sight gauges. A gauge installation may be shipped complete and fully assembled; or it may be provided as a kit of parts which are easily assembled on site. The clamping means provided are adjustable longitudinally of the gauge assembly. The end fittings are adjustable to suit the predetermined dimensions of a pre-existing installation so that a new gauge can be fitted instead of an existing one.

Although a particular type of end fitting has been described and illustrated, those skilled in the art will appreciate that other types of end fitting, conventional in the art, could be used instead; for example those incorporating bleed taps or valves.

The glasses and the channel members between which individual glasses are located, can be produced in sets each of different lengths, so that, with various lengths suitably combined, a wide range of overall lengths can be achieved.

Replacement is easily accomplished by unskilled labour, on site. Leakages can be easily spotted and rectified by tightening or replacing seals.

The U or channel shaping of the backing plates provides the main contribution to the structural stiffness and strength of the installation, while the metal connector blocks, which are securely bolted to the backing plates, may be employed to form structurally strong connections between adjacent backing plates disposed aligned end to end. With this arrangment the glasses themselves are mainly relieved of structural stresses, as are also the C-clamps which merely secure the gauge installation of the wall of the tank or container.

The gauge now proposed will be found to have a strength/weight characteristic favourably comparable with that of any other gauge of equivalent versatility.

We claim:

1. A flat glass sight gauge in which a plurality of sight glasses are aligned end to end to give the required length, said gauge including, in combination:

at least two elongate rectangular blocks of glass, each block having formed in one of its major faces a trough with a mouth which extends longitudinally of the major length of said face, but terminates short of the end of the block, so as to leave a flat surface on the said major face of the block surrounding the mouth of the trough of each glass block;

the base of each trough being formed with a plurality of longitudinally extending, parallel prismatic grooves;

metal backing plate means for mounting said glass blocks, said backing plate means having a flat frontal face and a reverse face with full length laterally spaced flanges;

an endless strip of sealing material being disposed on said flat surface surrounding the mouth of each trough;

said strip being sandwiched between the block and the flat frontal face of the backing plate means to which the block is clamped;

the said backing plate means being apertured to provide holes leading to the opposite ends of the troughs;

and wherein at least two adjacent blocks are secured end to end in alignment and including means for providing liquid intercommunication between the holes leading to adjacent ends of the two troughs of the said two adjacent blocks;

said means for providing liquid intercommunication comprising, for each junction between adjacent glass blocks, a metal connector block secured on and separable from the reverse face of the backing plate means between the lateral flanges of said plate means;

the connector block having a duct communication between the holes in the backing plate means, each said hole communicating with an end of a said trough, and sealing means in the connector block surrounding the mouths of said holes; and bolts securing the connector block to the reverse face of the backing plate means, which on being tightened, also impose pressure on the seals.

2. A gauge according to claim 1, wherein the gauge is provided at one or both of its ends with a banjo-type pipe coupling for providing liquid flow intercommunication between an end trough of a sight glass, and the bore of a pipe communicating with the interior of a liquid container, said end trough and said pipe bore extending approximately at right angles to one another, and said banjo-type coupling surrounding said bore, the distance between the banjo-type pipe coupling and the end trough being adjustable in the direction in which the end trough extends longitudinally.

3. A gauge according to claim 1, including at least one clamp engaging said backing plate means, and means for affixing the clamp to a wall for mounting the gauge onto a liquid container of which said wall forms a part, said clamp being a C-clamp and being adjustable longitudinally of said backing plate means.

4. A flat glass sight gauge in which a plurality of sight glasses are aligned end to end to give the required length, said gauge comprising at least two sighting glasses aligned end to end and each comprising an elongate glass block having a longitudinal trough formed in a major face thereof so as to be surrounded by a continuous substantially planar marginal portion of that face, which trough has a base provided with longitudinal prismatic grooves;

structural stiff metal backing plate means for mounting said glass blocks;

at least one endless strip of sealing material being disposed to surround each trough and to form a seal between a said substantially planar marginal face portion of a said glass block and said metal backing plate means;

bolt means for clamping each said glass block to said backing plate means;

said backing plate means having apertures therethrough at or towards each end of each said trough and rigid metal connector blocks being bolted to the reverse side of the backing plate means and sealed over the rear of each said aperture;

said connector blocks having ducts forming a sealed conduit providing liquid intercommunication through the apertures and between adjacent ends of successive troughs intermediate the ends of the gauge, and, at the ends of the gauge, between the ends of the troughs and a respective gauge end fitting;

liquid tight sealing means interposed between the connector blocks and the backing plate means and sealing around the said apertures in the backing plate means, said sealing means comprising an apertured metal plate sandwiched between two gaskets, one of the gaskets bedding against the reverse side of such backing plate means and the other bedding against a planar face of a connector block;

said connector blocks serving also to provide structural reinforcement to the gauge in regions where the glass blocks terminate.

5. A flat glass sight gauge in which a plurality of sight glasses are aligned end to end to give the required length, said gauge comprising at least two sighting glasses aligned end to end and each comprising an elongate glass block having a longitudinal trough formed in a major face thereof so as to be surrounded by a continuous substantially planar marginal portion of that face, which trough has a base provided with longitudinal prismatic grooves;

structurally stiff metal backing plate means for mounting said glass blocks;

at least one endless strip of sealing material being disposed to surround each trough and to form a seal between a said substantially planar marginal face portion of a said glass block and said metal backing plate means;

cover plate means for covering said glass blocks;

each glass block being secured against the backing plate means by being sandwiched between the backing plate means and said cover plate means;

bolt means for bolting said cover plate means to said backing plate means and clamping each said glass block to said backing plate means, both the backing plate means and the cover plate means having lateral stiffening flanges to resist transverse flexing of the plate means when the bolt means is tightened;

said backing plate means being apertured at or towards each end of each said trough and rigid metal connector blocks being bolted to the reverse side of the backing plate means and sealed over the rear of each said aperture;

said connector blocks having ducts providing sealed intercommunication between adjacent ends of successive troughs intermediate the ends of the gauge, and, at the ends of the gauge, between the ends of the troughs and a respective gauge end fitting;

said connector blocks serving also to provide structural reinforcement to the gauge in regions where the glass blocks terminate.

6. A gauge according to claim 5, wherein said cover plate means comprises a cover plate for each glass block, each said cover plate being windowed and longitudinally coextensive with only one glass block, structural support for two adjacent glass blocks, arranged end to end in alignment, being provided by said backing plate means to which the two adjacent blocks, each with its cover plate, are bolted.

7. A flat glass sight gauge in which a plurality of sight glasses are aligned end to end to give the required length, a structurally stiff metal base plate having a frontal face and a reverse side, the glasses being secured to the frontal face of said structurally stiff metal base plate and defining fluid passages at the front of the base plate visible through the aligned glasses, fluid connections between the aligned glasses being formed at the reverse side of the base plate, rigid metal connector block means overlying the aligned ends of the sight glasses and being secured by screwthreaded bolt means to the reverse side of the base plate, said fluid connections being defined by apertures in said base plate and passages in said connector block means, cover plate means for covering said sight glasses, each glass being sandwiched between the base plate and said cover plate means, said cover plate means being secured by said screwthreaded bolt means to the base plate, and wherein the base plate and the cover plate means have lateral stiffening flanges so as to resist transverse flexing when the screwthreaded bolt means are tightened, said cover plate means being windowed to permit viewing of the fluid passages defined by the sight glasses.

8. A sight gauge according to claim 7, including liquid tight sealing means interposed between said connector block means and the reverse side of the base plate, said sealing means sealing around said apertures in the said base plate, with said sealing means comprising an apertured metal plate sandwiched between two gaskets, one of the gaskets bedding against the reverse side of the base plate and the other bedding against a planar face of the said conenctor block means.

9. A flat glass sight gauge comprising at least two sight glalsses aligned end to end and each comprising an elongate glass block having a longitudinal trough formed in a major face thereof so as to be surrounded by a continuous substantially planar marginal portion of that face, which trough has a base provided with longitudinal prismatic grooves;

a metal base plate having a frontal face;

at least one endless strip of sealing material being disposed to surround each trough and form a seal between the substantially planar marginal face portion thereof and said frontal face of the metal base plate;

said base plate having apertures at or towards each end of each said trough and rigid metal connector block means for communicating said troughs, said connector block means being secured to the reverse side of and separable from the base plate and sealed over said apertures;

said metal connector block means having duct means providing, with said apertures, sealed intercommunication between adjacent ends of successive troughs intermediate the ends of the gauge, and, at the ends of the gauge, between the ends of the troughs and a respective gauge end fitting;

cover plate means for covering said glass blocks;

each glass block being secured against the frontal face of the base plate by being sandwiched between the base plate and said cover plate means secured by screwthreaded bolt means to the base plate, said bolt means securing said connector block means to the reverse side of the base plate;

said base plate and said cover plate means have lateral stiffening flanges resisting transverse flexing of the plates when the screwthreaded bolt means are tightened.

10. A gauge according to claim 9, including liquid tight sealing means interposed between said connector block means and the reverse side of the base plate for sealing around said apertures in the said base plate, said sealing means comprising an apertured metal plate sandwiched between two gaskets, one of the gaskets bedding against the reverse side of the base plate and the other bedding against a planar face of said connector block means.

11. A gauge according to claim 9, wherein said cover plate means comprises a single cover plate, said base plate and said cover plate being coextensive, a plurality of glass blocks being secured between said base plate and said cover plate.

12. A gauge according to claim 9, wherein said base plate is longitudinally coextensive with at least two such glass blocks secured to its frontal face in end to end alignment.

13. A gauge according to claim 12, wherein said cover plate means comprises plural cover plates, each said cover plate being windowed and longitudinally coextensive with only one glass block.

14. A gauge according to claim 12, wherein said cover plate means is windowed and longitudinally coextensive with at least two glass blocks.

15. A flat glass sight gauge comprising at least two sight glasses aligned end to end and each comprising an elongate glass block having a longitudinal trough formed in a major face thereof so as to be surrounded by a continuous substantially planar marginal portion of that face, which trough has a base provided with longitudinal prismatic grooves; a metal base plate and a windowed cover plate associated with each glass block, at least one endless strip of sealing material being disposed to surround the said trough of each glass block and to form a seal between the substantially planar marginal face portion of said sight glass block and the associated metal base plate; each said base plate being coextensive with the associated sight glass block with the glass block being sandwiched between the base plate and the associated windowed cover plate which is also coextensive with the glass block, the base plates backing adjacent aligned glass blocks abutting end to end, and the cover plates of said adjacent aligned glass blocks abutting end to end; and means providing sealed liquid flow intercommuniation between the adjacent ends of the troughs of two adjacent aligned glass blocks, said means comprising a single metal connector block secured on and separate from the reverse faces of the two abutting base plates respectively backing the two glass blocks, apertures leading through each of the two base plates to the troughs of the respective adjacent aligned glass blocks, the metal connector block including a conduit to provide liquid interconnections between said apertures with liquid tight sealing means being interposed between the single connector block and the two backing plates and sealing around the said apertures in the said backing plates, said sealing means comprising an apertured metal plate sandwiched between two gaskets, one of the gaskets bedding against the reverse side of both said base plates and the other bedding against a planar face of the said connector block.

16. A sight gauge according to claim 15, wherein each cover plate is a U-sectioned metal channel member having flanges extending longitudinally over its full length, the glass blocks being located between the said cover plate flanges, and including at the location of the junction between two adjacent aligned glass blocks, screw threaded fastening bolt means passing through said cover plates and said base plates of said respective glass blocks, and through the connector block at said location, said fastening bolt means on being tightened, securing said cover plates, glass blocks, base plates and connector block together, and exerting pressure on the interposed glass blocks with their associated seals, as well as on the seal means between the connector block and the reverse sides of the base plates where they abut end to end at that location, over-tigtening of said fastening means being prevented by the lateral flanges of said cover plates abutting against said base plates.

* * * * *